United States Patent [19]
Dennis

[11] 4,023,813
[45] May 17, 1977

[54] AUTOMATIC RECORD CHANGER WITH CYCLE DELAY TO FACILITATE CHANGING OF THIN, LIGHTWEIGHT RECORDS

[75] Inventor: James T. Dennis, Oklahoma City, Okla.

[73] Assignee: James T. Dennis, Oklahoma City, Okla.

[22] Filed: Jan. 12, 1976

[21] Appl. No.: 648,147

[52] U.S. Cl. .............................. 274/10 R; 74/435
[51] Int. Cl.² ........................................ G11B 17/12
[58] Field of Search ................. 274/10 R; 74/435

[56] References Cited
UNITED STATES PATENTS

| | | |
|---|---|---|
| 2,426,978 | 9/1947 | Alexandersson .............. 274/10 R |
| 2,715,027 | 8/1955 | Bacher ........................... 274/10 R |
| 2,747,879 | 5/1956 | Bacher ........................... 274/10 R |
| 3,838,860 | 10/1974 | Guha .............................. 274/10 R |
| 3,848,875 | 11/1974 | Miyoshi ......................... 274/10 R |

Primary Examiner—Steven L. Stephan
Attorney, Agent, or Firm—Mason, Kolehmainen, Rathburn & Wyss

[57] ABSTRACT

The record changing cycle of an automatic record changer having an umbrella type centering spindle is modified so that a delay is provided at the appropriate point in the cycle when the bottom record is to be released from the record stack. This delay is sufficient that a thin, lightweight bottom record has time to become unstuck from the remainder of the stack and fall downwardly before the record changing cycle is resumed, thereby preventing malfunctioning of the record changer when changing thin, lightweight records.

8 Claims, 9 Drawing Figures

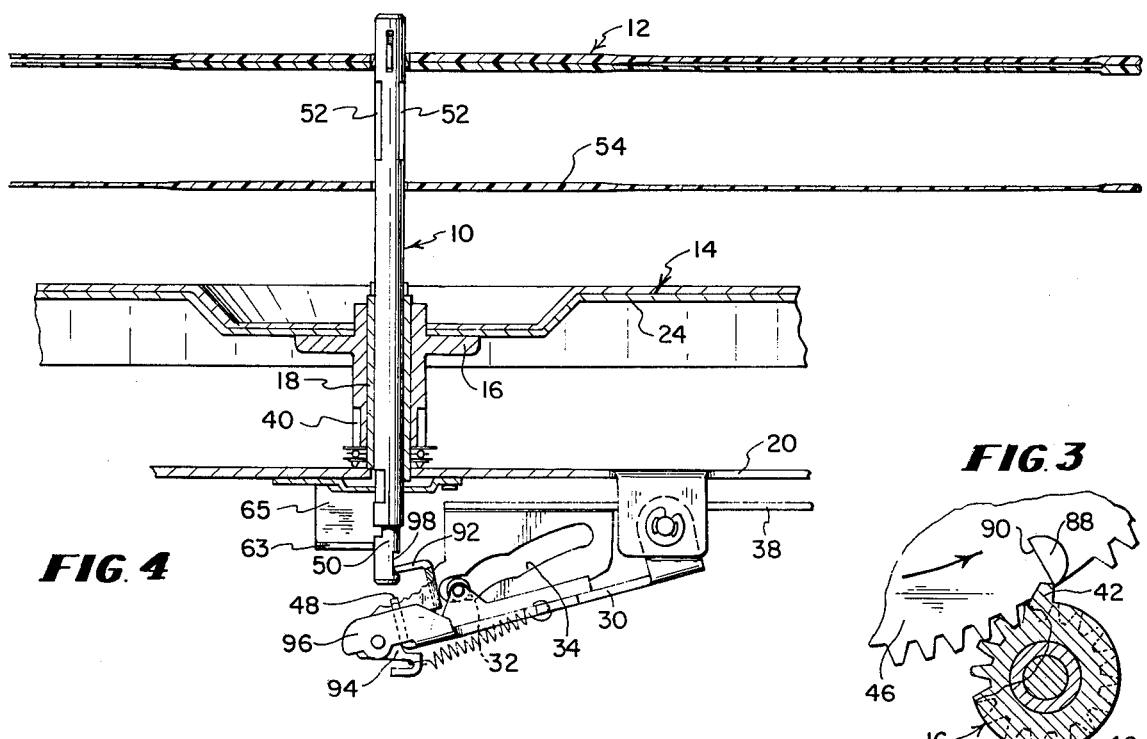
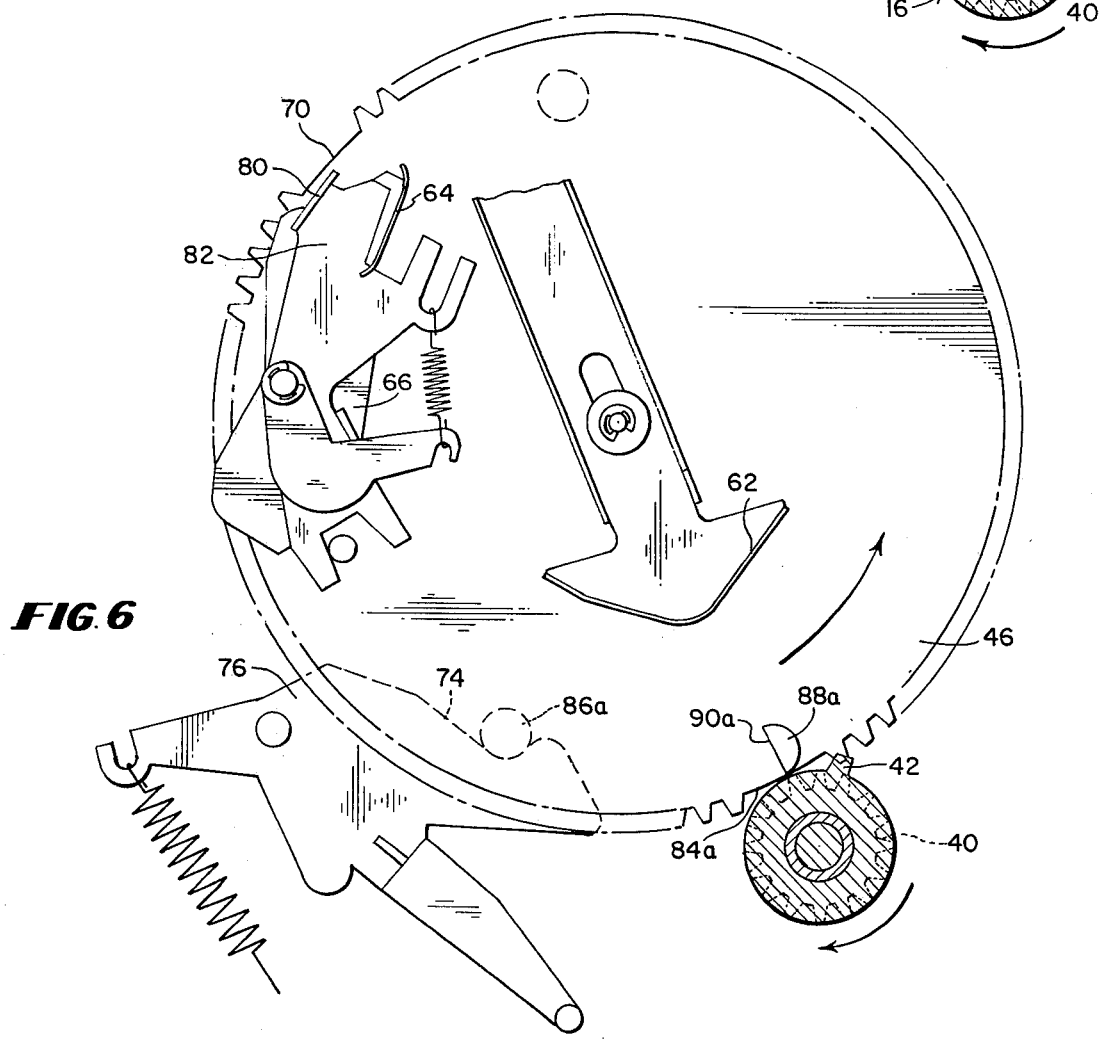

AUTOMATIC RECORD CHANGER WITH CYCLE DELAY TO FACILITATE CHANGING OF THIN, LIGHTWEIGHT RECORDS

The present invention relates to automatic record changers, and, more particularly, to automatic record changers which are particularly adapted to function properly with large diameter, thin, lightweight records.

Automatic record changers of the type employing a centering spindle of the so-called umbrella type have been used for many years. One such automatic record changer is shown in U.S. Pat. No. 3,848,875 and umbrella type centering spindles for use in such record changers are shown, for example, in U.S. Pat. Nos. 3,853,326; 3,582,083; and 3,603,598. When an umbrella type centering spindle is employed, the record stack is supported on a plurality of retractable fingers, usually three in number, which extend beyond the periphery of the centering spindle and support the bottom record of the stack. During an automatic record changing cycle all of the records above the bottom record of the stack are gripped by a suitable arrangement which moves outwardly into engagement with the inner edge of the records above the bottom record after which the supporting fingers are collapsed or withdrawn into the shell of the spindle so that the bottom record is free to drop downwardly of its own weight onto the turntable.

While such umbrella type centering spindles are generally suitable for their intended purpose, there has recently been introduced into the market a line of large diameter (12-inch) records which are extremely thin and of light weight. Furthermore, these records are formed in such a manner that the portion which contains the grooves is recessed slightly below the outer rim portion of the record and the flat center portion of the record. Accordingly, when these thin lightweight records are stacked the outer edge thereof may seal off tight to the next record. When such lightweight large-diameter records are placed on an umbrella type centering spindle difficulties are experienced in obtaining proper operation during the record changing cycle. These difficulties arise because when the records above the bottom record are clamped the bottom record does not in all instances immediately drop downwardly but remains stuck to the record stack for a substantial period of time until sufficient air is permitted to enter the space between the bottom record and the next record, either through the center hole opening or through the outer edge of the records, to break this vacuum seal and permit the record to drop. Since these records are of very light weight, it may take several seconds for the weight of the record to break the seal with the next record and permit the bottom record to be dropped onto the turntable. With some types of umbrella spindles the bottom record remains stuck to the record stack a sufficient length of time that the tone arm is moved inwardly over the previously played record and the released record drops downwardly on top of the tone arm so that no record change is produced and disastrous results may be produced for the tone arm needle and the previously played record. Furthermore, the bottom record may be delayed just sufficiently to fall as the umbrella fingers open up to support the record stack for the next playing cycle with the result that the supporting fingers are prevented from spreading outwardly and the whole stack of records comes tumbling down the spindle onto the turntable. With other types of umbrella spindles the bottom record remains stuck to the record stack a sufficient length of time that the last record shut off mechanism of the changer is actuated so that the machine is shut off at the end of the cycle rather than playing the next record.

It is, therefore, an object of the present invention to provide a new and improved automatic record changer wherein one or more of the above described disadvantages of prior art arrangements are avoided.

It is another object of the present invention to provide a new and improved automatic record changer provided with an umbrella type spindle and capable of changing large-diameter, thin, lightweight records in a reliable and foolproof manner.

It is a further object of the present invention to provide a new and improved automatic record changer capable of changing large-diameter, thin, lightweight records wherein a slight delay in the record changing cycle is provided at the appropriate point to allow the bottom record to break free from the remainder of the record stack.

It is another object of the present invention to provide a new and improved automatic record changer for changing large-diameter, thin, lightweight records, wherein means are provided for disengaging the turntable from the automatic record changing mechanism at a predetermined point in the record changing cycle so as to provide a slight delay of the cycle which is of sufficient duration to permit the bottom record to break free from the remainder of the record stack, and means for re-engaging the turntable with the record changing mechanism after said delay, thereby to complete the record changing cycle.

Briefly, in accordance with one aspect of the invention, a slight delay in the record changing cycle, which is preferably of a duration slightly less than one revolution of the turntable, is provided in timed relation to the actuating mechanism for an umbrella type spindle so that the bottom record has sufficient time to break free from the remainder of the record stack. A cycling gear is provided which is rotated one revolution during the record changing cycle, by means of engagement with a pinion gear on the turntable, and drives the automatic record changing mechanism so as to actuate the umbrella spindle and tone arm in timed relation to one another. Conventional automatic tripping means are provided for initially engaging the cycling gear with the turntable pinion gear to initiate a record changing cycle. However, at the point in the record changing cycle at which the record supporting umbrella spindle fingers are free to move downwardly or are moved from beneath the bottom record, the turntable is disengaged from the cycling gear for a period of somewhat less than one revolution of the turntable to allow time for the bottom record to break free from the record stack and be deposited on the turntable. Disengagement of the turntable for this brief period is achieved by providing a notch in the cycle gear at a point such that the driving lug on the turntable hub has just moved beyond the teeth of the cycling gear. A projection is provided on the cycling gear which is positioned to be engaged by the drive lug on the turntable hub after the turntable has rotated almost one full revolution with the cycling gear stationary. When this drive lug engages the projection on the cycling gear it moves the cycling gear so that the teeth thereof re-engage the pinion on the turntable hub and the automatic record changing cycle is completed. Means are provided for holding the cycling gear in a stationary position during the period it is disengaged from the turntable hub.

The invention, both as to its organization and method of operation, together with further objects and advantages thereof, will best be understood by reference to the following specification taken in connection with the accompanying drawings in which:

FIG. 3 is fragmentary sectional view similar to FIG. 2 and showing the operation of the turntable hub in reestablishing engagement with the cycling gear;

FIG. 4 is a side elevational view similar to FIG. 1 but showing the umbrella spindle support fingers in retracted position;

FIG. 6 is an enlarged plan view of the turntable hub and cycling gear required for the record changing mechanism of FIG. 5 in accordance with the present invention;

Figure 1:
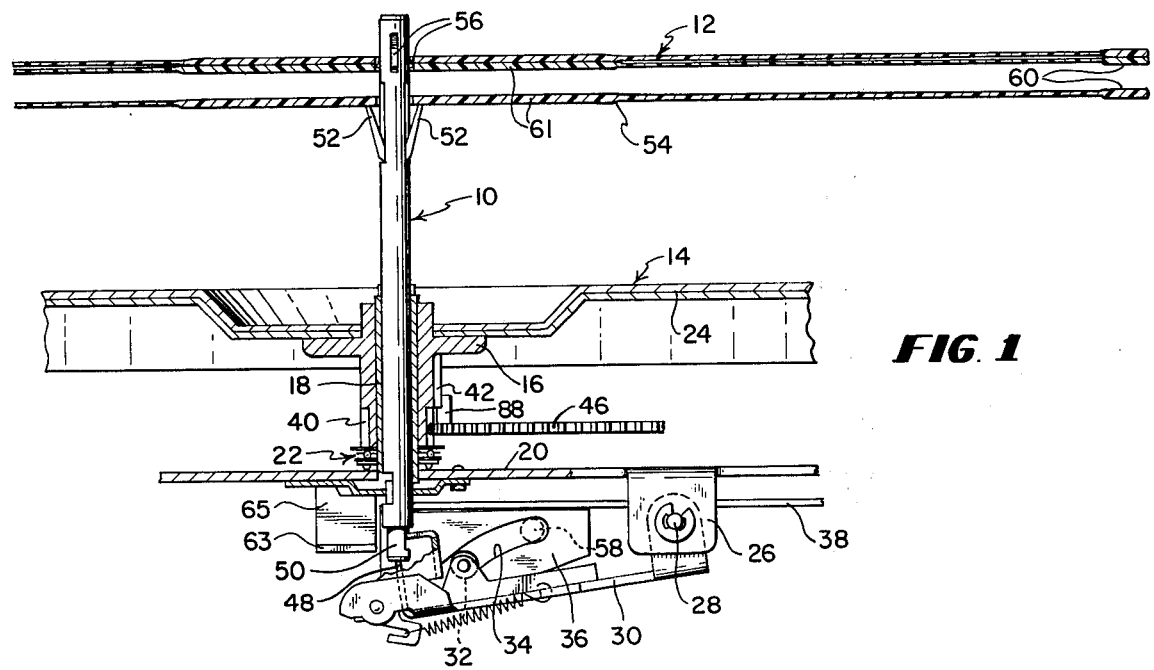
FIG. 1 is a sectional side-elevational view of a record changer mechanism embodying the principles of the present invention.

Referring now to the drawings, and more particularly to FIGS. 1 to 4, inclusive, thereof, the present invention is therein illustrated as comprising an umbrella type recentering spindle indicated generally at 10 which is arranged to support a stack of large-diameter, relatively thin, lightweight records indicated generally at 12 above a rotatable turntable indicated generally at 14. The turntable 14 includes a hub member 16 which is rotatably mounted on a sleeve bearing 18 which is mounted in the sub base member 20 of the automatic record changer. The turntable hub 16 rides on a thrust ball bearing assembly indicated generally at 22 and carries the turntable proper 24 which is secured to the central hub 16 by any suitable means.

The sub base 20 is provided with a pair of downturned ears 26 which support a pin 28 on which is pivotally mounted a control lever 30 which carries a roller 32 adapted to ride in a slot 34 provided in a bracket 36 which is mounted on the underside of the reciprocably movable cycling slide 38 of the record changing mechanism. The turntable hub 16 includes a pinion gear 40 formed integrally therewith and a drive lug portion 42 which projects beyond the periphery of the teeth of the pinion gear 40 and is positioned above this pinion gear which is employed to initiate a record changing cycle. The pinion gear 40 of the turntable hub 16 is arranged to engage the teeth 44 of a main cycling gear 46 which is rotatably mounted on the sub base 20.

The automatic record changing mechanism described thus far is shown and described in detail in U.S. Pat. No. 3,848,875 and reference may be had to this patent for a detailed description of the operation of the record changing mechanism which is incorporated herein by reference. However, for the purposes of the present invention, it may be stated that the cycling gear 46 in interconnected with the cycling slide 38 so that as the cycling gear rotates one full revolution during the record changing cycle the cycling slide 38 moves away from the center of the turntable 14 during the first portion of the record changing cycle and then returns to its initial position during the latter half of the record changing cycle. Movement of the slide 38 is employed to move the tone arm of the automatic record changer out beyond the record stack 12 during the first half of the record changing cycle and inwardly into engagement with the lead-in groove of a record on the turntable 14 during the last half of the record changing cycle, as will be readily understood by those skilled in the art. As the cycling slide 38 moves away from the spindle 10 the roller 32 moves downwardly in the slot 34 so that an upturned lug portion 48 on the control lever 30 is moved downwardly and permits the central control sleeve 50 of the spindle 10, which is connected to the fingers 52 and is spring biased upwardly, to move downwardly to the position shown in FIG. 1 under the weight of the bottom record which is sufficient to overcome the upward biasing force on the sleeve 50.

In the embodiment of FIGS. 1–4 the umbrella spindle 10 is preferably of the type shown and described in detail in U.S. Pat. No. 3,853,326 and reference may be had to said patent for a detailed description of this spindle. However, for the purposes of the present invention it may be stated that the three supporting fingers 52 are positioned somewhat above the position shown in FIG. 1 when the roller 32 occupies the position 58, shown in dotted lines in FIG. 1, at the upper end of the slot 34 so that the bottom record 54 of the record stack 12 is positioned to support the remaining records of the stack. In this uppermost position of the fingers 52, the three clamping members 56 which are provided in the upper end of the spindle 10 are retracted within the periphery of the spindle body 52 so that they do not engage the center hole portions of any of the records. Accordingly the entire record stack is supported on the fingers 52 when the roller 32 occupies the position 58 shown in FIG. 1 at the start of a record changing cycle.

When the roller 32 is moved from its initial position 58 to the position shown in FIG. 1 during the first portion of a record changing cycle the projection 48 is moved downwardly away from the bottom end of the control sleeve 50 and leaves this sleeve 50 free to move downwardly to the position shown in FIG. 1 by virtue of the weight of the bottom record 54 on the fingers 52. However, in many instances the outer rim portions 60 and center portions 61 of the bottom record and the next to bottom record in the stack become sealed tightly together so that the bottom record 54 remains stuck to the next to the bottom record of the stack for a substantial period of time before the suction between these two records is broken and the bottom record 54 is freed from the remainder of the record stack. When the bottom record 54 is freed from the remainder of the record stack its weight on the fingers 52 causes the control sleeve 50 to move downwardly against its spring bias to the position shown in FIG. 1.

In accordance with the present invention a short delay is provided in the record changing cycle at the appropriate point to provide additional time for the bottom record 54 to break free from the remainder of the record stack and move to the position shown in FIG. 1. However, before considering the manner in which this time delay is achieved, a general description will be given of the functioning of the cycling gear 46 during a conventional record changing cycle. As the tone arm of the record changer moves inwardly over the record, an automatic tripping slide 62 (FIG. 2) is moved toward the spindle hub 16. When the needle engages the runout groove of the record the slide 62 moves forwardly by an amount sufficient to engage an upturned flange portion 64 on an automatic tripping lever 66 which is pivotally mounted on the pin 68 carried by the cycling gear 46. A first notched portion 70 in the periphery of the cycling gear 46 is positioned opposite the pinion teeth 40 of the turntable hub 16 during the playing cycle so that the turntable and cycling gear 46 are disengaged while a record is being played. In order to hold the cycling gear 46 in this initial position a downwardly extending pin 72 on the cycling gear 46 is arranged to engage a notched portion 74 of a pivotally mounted detent lever 76 which is spring biased by means of the coil spring 78 so as to hold the lever 76 in engagement with the pin 72. However, when the tripping member 62 moves the flange 64 inwardly an upturned flange portion 80 of an upper tripping member 82 which is also pivotally mounted on the post 68, is moved by frictional connection with lever 66 into the path of the drive lug portion 42 on the turntable hub 16. Engagement of the drive lug 42 with the edge of the flange 80 as the turntable is rotating causes the cycling gear 46 to be moved by an amount sufficient that the teeth 44 thereof are engaged with the pinion teeth 40 on the turntable hub so that the cycling gear 46 starts to rotate, thereby initiating the record changing cycle.

Figure 2:
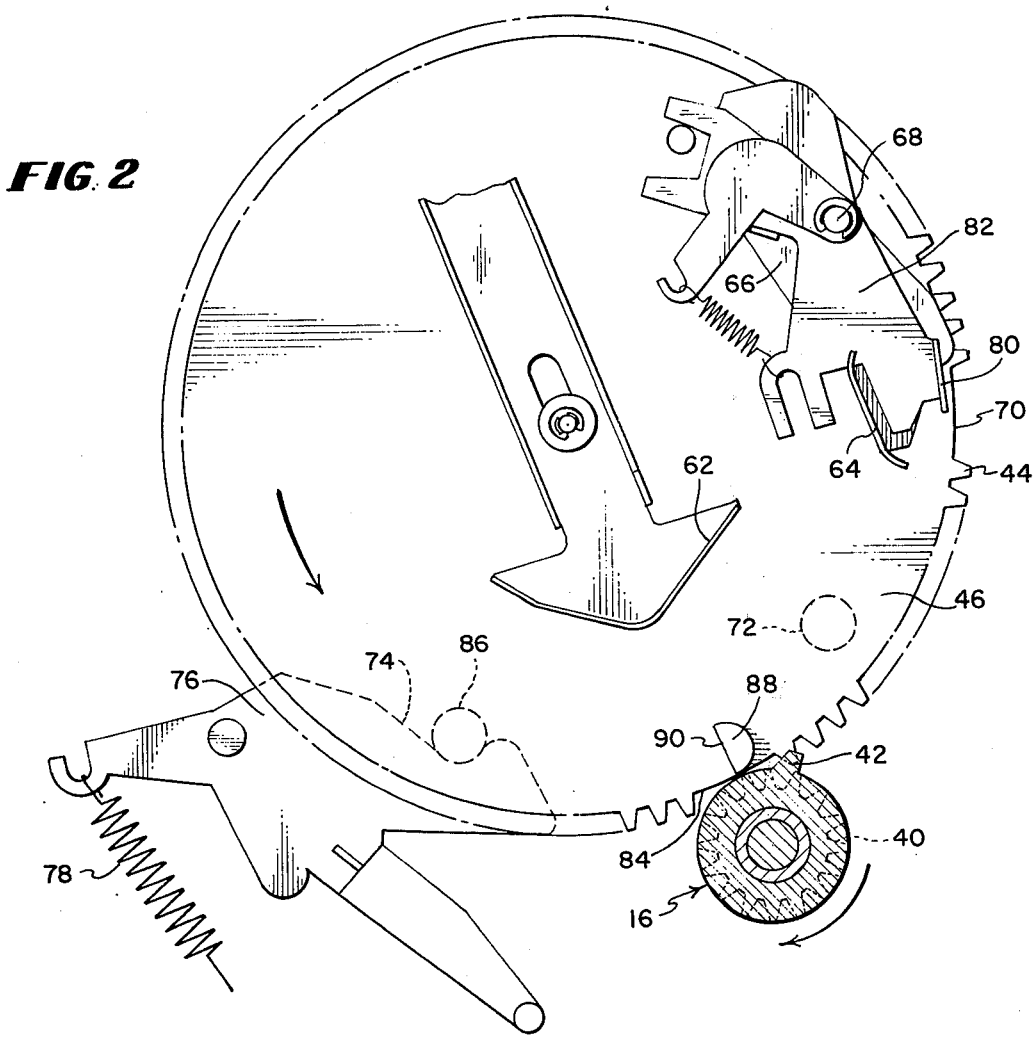
FIG. 2 is a plan view, partly in section and shown in enlarged scale, of the turntable hub and cycling gear portion of the record changing mechanism of FIG. 1.

When the cycling gear 46 has moved to the position shown in FIG. 2 the roller 32 has been moved downwardly in the slot 34 to the position shown in FIG. 1 so that the projection 48 is removed from the bottom of the control sleeve 50. Under these conditions the control sleeve 50 should be moved downwardly to the position shown in FIG. 1 under the weight of the bottom record 54. However, if the bottom record 54 remains stuck to the record stack, as described in detail heretofore, its weight is not transferred to the supporting fingers 52 since the record stack is now held by the clamping members 56. As long as the bottom record remains stuck to the remainder of the record stack the control sleeve 50 remains in its uppermost position in which position a flange portion 63 of the last record shut off lever 65 can move under the bottom end of the control sleeve 50, thereby setting up the last record shut off mechanism of the record changer to turn off the machine at the end of the record changing cycle presently in progress. This malfunctioning of the machine is of course undesirable since it prevents the machine from changing records each time the bottom record sticks to the remainder of the record stack and effectively prevents the machine from functioning as an automatic record changer.

The above described malfunctioning of the machine is prevented in accordance with the present invention by providing a delay in the record changing cycle at the position shown in FIG. 1 which is of sufficient duration to permit the bottom record to break free from the rest of the stack. When this occurs the weight of the bottom record is transferred to the fingers 52 so that the control sleeve 50 is moved downwardly to the position shown in FIG. 1. After this delay is over the record changing cycle continues. However, the control sleeve 50 is now in a position to block the flange 63 of the last record shut off member 65, as shown in FIG. 4, so that the machine is not turned off at the end of the record changing cycle but instead proceeds to play the record which has been deposited on the turntable 24. More particularly, in order to provide a delay of a duration slightly less than one revolution of the turntable (generally at 33⅓ rpm), a second notch 84 is provided in the periphery of the cycling gear 46 and a second detent pin 86 (FIG. 2) is provided on the cycling gear 46 at the appropriate position to engage the notch 74 of the detent lever 76 when the notch 84 is positioned opposite the pinion teeth 40. Accordingly, when the notch 84 in the cycling gear teeth is encountered as the gear 46 is being rotated, the turntable becomes disengaged from the cycling gear 46 while this cycling gear is held temporarily at this point in the record changing cycle by engagement of the pin 86 with the detent lever 76.

In order to re-establish engagement between the turntable and the cycling gear 46 after approximately one revolution of the turntable, an upstanding lug portion 88 is provided on the cycling gear 86 which is provided with a portion 90 which is positioned in the path of the drive lug 42 provided on the turntable hub 16. Since the drive lug 42 initially establishes an engaged relationship between the turntable pinion and the cycling gear by engagement of the same pinion teeth 40 with the same teeth of the cycling gear 46, timed movement of the drive lug 42 to the position shown in FIG. 2 occurs at which point the turntable hub 16 becomes disengaged from the cycling gear. Accordingly, the turntable may rotate almost one full revolution before the drive lug 42 is rotated a sufficient amount to engage the portion 90 of the lug 88 provided on the cycling gear 46 and the cycling gear remains stationary for this period of time. However, when the lug 42 strikes the portion 90 it again moves the cycling gear 46 so that the teeth 44 thereof are re-engaged with the pinion teeth 40 on the turntable hub 16, as shown in FIG. 3. The cycling gear 46 then continues to rotate through the remainder of one revolution at which time the notch 70 is positioned opposite the pinion 40 and the pin 72 is positioned in the notch 74 of the detent lever 76 so that the cycling gear 46 is held in its initial position during the playing cycle.

As the cycling gear 46 continues to move after it becomes re-engaged with the pinion 40, the roller 32 is moved on down to the bottom of the slot 34 and the control lever 30 is pivoted to the position shown in FIG. 4. As this occurs, the right angle end portion 92 of a lever 94 which is pivotally mounted on an upturned flange portion 96 of the control member 30, which normally rides on the surface of the control sleeve 50, enters a notch 98 in the control sleeve 50 and engages an inner sleeve and pulls the supporting fingers 52 of the umbrella spindle 10 downwardly to a point at which they are retracted within their respective slots in the spindle 10 so that the bottom record 54 is now free to drop to the turntable 14, as shown in FIG. 4.

From the above description it will be appreciated that the notch 84 provided in the periphery of the cycling gear 46 must be in proper timed relationship with the operation of the umbrella spindle 10 in order to provide a delay of the record changing cycle at the appropriate point in the cycle to permit the bottom record to break free from the record stack and force the control sleeve 50 downwardly so that it will block the last record shut off member 65, thereby preventing the machine from being turned off, as described in detail heretofore.

Figure 5:
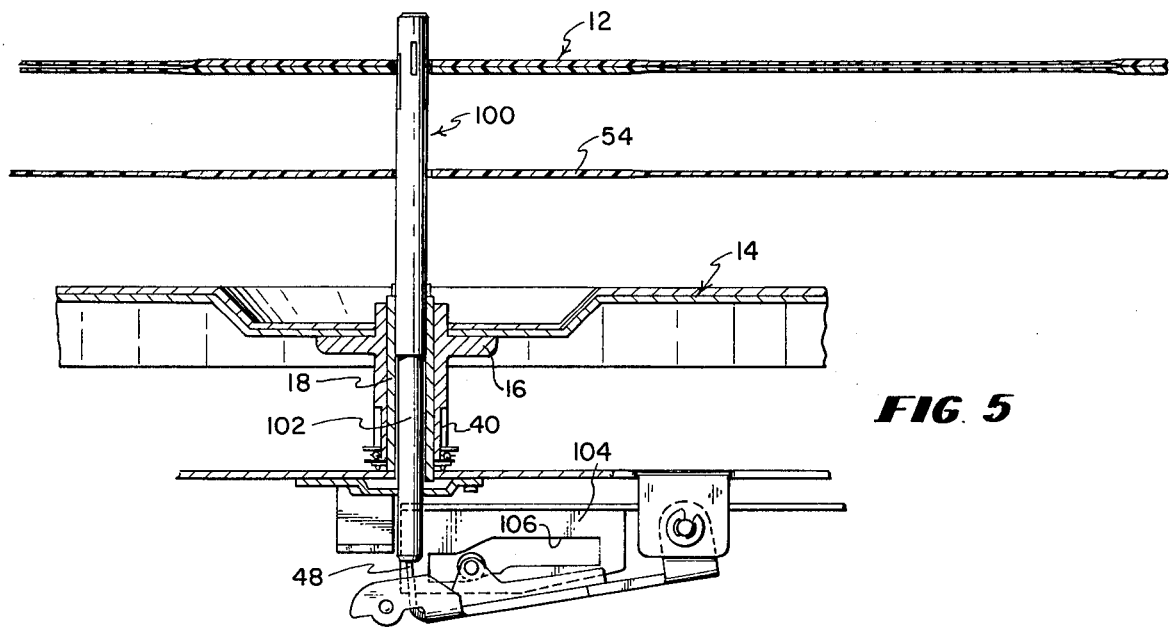
FIG. 5 is a side elevational view of an alternative embodiment of the present invention wherein a different type of umbrella spindle is employed to support the record stack and release the bottom record to the turntable.

In FIGS. 5 and 6 an alternative embodiment is shown wherein a different type of umbrella spindle 100 is employed. This umbrella spindle may be of the type shown and described in detail in U.S. Pat. No. 3,582,083 and 3,603,598. However, in order to illustrate the operation of this type of umbrella spindle in a record changer mechanism of the type shown in U.S. Pat. No. 3,848,875 and as described in detail heretofore in connection with FIGS. 1 to 4, inclusive, an extension member 102 for the inner control sleeve of the spindle 100 is provided so that this spindle can cooperate with the record changer mechanism described heretofore in connection with FIGS. 1 to 4, inclusive. In addition, a bracket 104, having a slot 106 formed therein is substituted for the bracket 36 described in connection with the embodiment of FIGS. 1 to 4, inclusive, and the lever 94 is eliminated. The spindle 100 is actuated by an internal spring preloading of the sleeve attached to member 102. In other respects the mechanism of the record changer of FIGS. 5 and 6 is identical to that described in detail heretofore in connection with FIGS. 1 to 4, inclusive.

Since the timing of the umbrella spindle 100 is somewhat different than that of the umbrella spindle 10, the cycling gear 46 has a notch 84a in the periphery thereof which is positioned at a different point in the record changing cycle than the notch 84 in the embodiment of FIGS. 1 to 4, inclusive. More particularly, the position of the notch 84a relative to the notch 70 in the cycling gear 46 is chosen so that the tone arm is beyond the downward path of the records and the supporting fingers of the umbrella spindle have been fully retracted, as shown in FIG. 6. When the notch 84a is encountered the cycling gear 46 is then disengaged from the turntable for somewhat less than one revolution. This is because with the spindle 100 the supporting fingers are retracted at a different point in the record changing cycle than the point at which the fingers 52 of the spindle 10 are lowered. Accordingly, when the spindle 100 is used in a conventional changer the malfunctioning caused by sticking of the bottom record to the remainder of the record stack delays the actual dropping of the bottom record onto the turntable with the result that the tone arm has moved inwardly over the edge of the turntable before the bottom record drops so that the bottom record falls on the tone arm and damages the needle.

Since the notch 84a in the cycling gear 46 provides a delay of slightly less than one revolution of the turntable, which corresponds to about two seconds when 33⅓ rpm records are played, sufficient time is provided by this delay to permit the bottom record 54 to break free from the remainder of the record stack and fall to the turntable 14 while the tone arm is stationary at a point beyond the path of the dropping record before the record changing cycle is resumed and the tone arm is moved inwardly and downwardly into engagement with the lead-in groove of the record 54.

In other respects, the operation of the embodiment of FIGS. 5 and 6 to effect the desired delay in the record changing cycle to permit the bottom record 54 to break free from the record stack 12 is identical to that described in detail heretofore in connection with the embodiment of FIGS. 1 to 4, inclusive. The pin 86a in the embodiment of FIGS. 5 and 6 is positioned to hold the cycling gear 46 stationary in the detented position with the notch 84a opposite the pinion gear 40 during the above-described delay.

Figure 7:
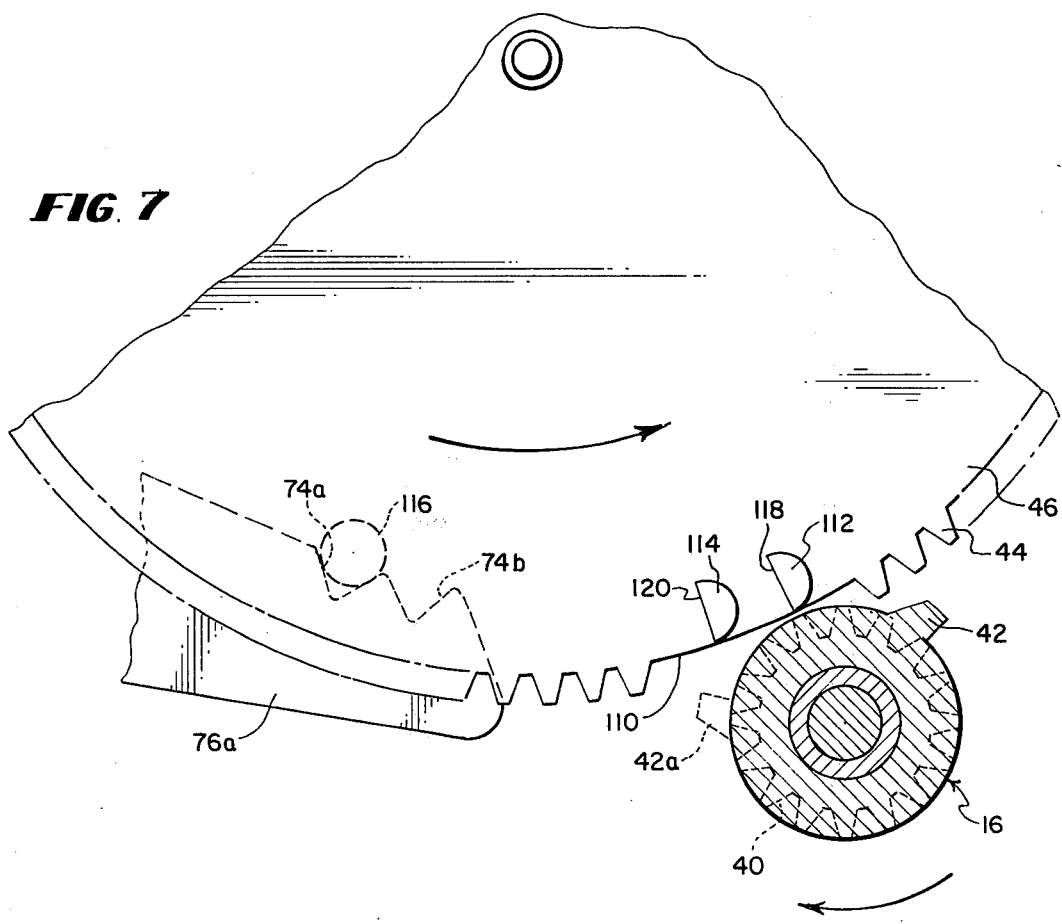
FIG. 7 is a plan view of a further alternative embodiment of the present invention wherein an extended delay of the cycling gear movement is achieved.
Figure 8:
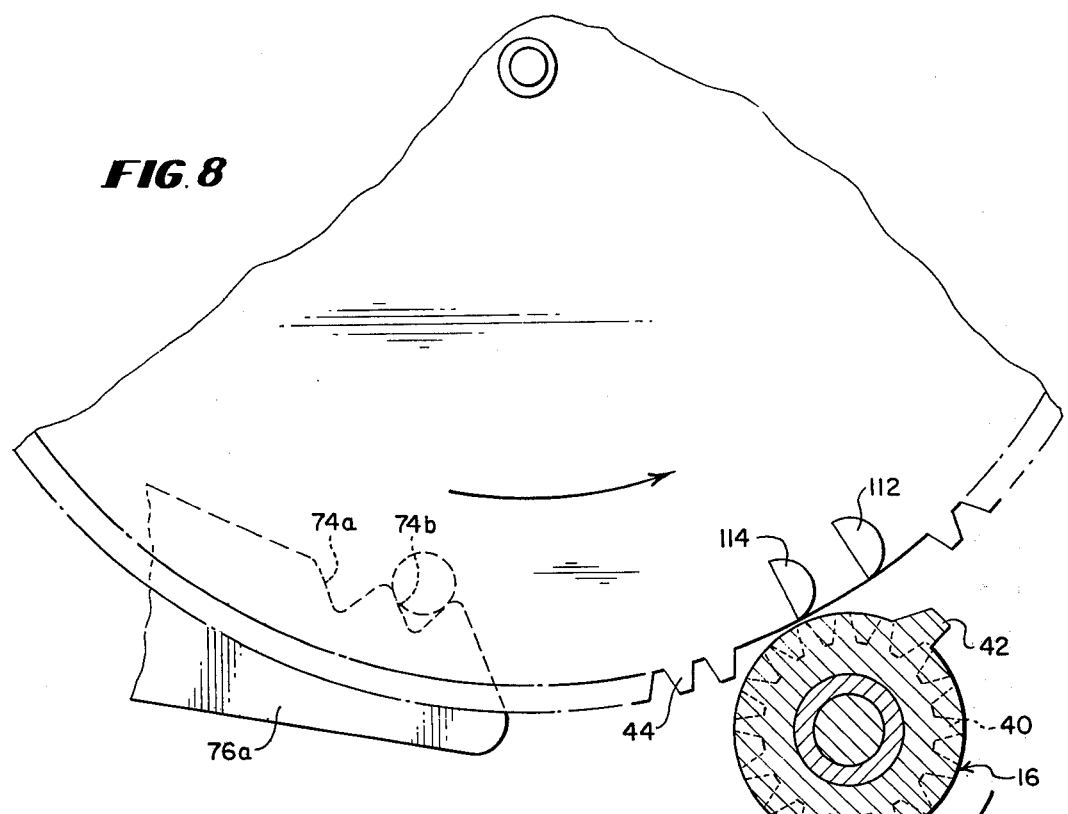
FIG. 8 is a plan view similar to FIG. 7 but showing the cycling gear in the second half portion of the delay.

In the event that a longer delay than one revolution of the turntable is required to permit the bottom record to break free from the record stack, the embodiment of FIGS. 7 and 8 may be employed. It will be understood that a longer delay may be desirable in connection with either type of umbrella spindle described heretofore, or with umbrella spindles of other types. In the embodiment of FIGS. 7 and 8 the notch 110, provided in the periphery of the cycling gear 46 to effect a delay in the record changing cycle in the manner described in detail heretofore, is of somewhat greater extent than either the notch 84 of the embodiment of FIGS. 1 to 4 or the notch 84a of the embodiment of FIGS. 5 and 6. Also, two lugs 112 and 114 are provided on the cycling gear 46 at appropriate points along the length of the notch 110.

The detenting lever 76a is also provided with two notches 74a and 74b each of which is adapted successively to receive the detent pin 116 provided on the under side of the cycling gear 46. As shown in FIG. 7 when the teeth 40 of the pinion gear on the turntable hub 16 first become disengaged with the teeth 44 of the cycling gear 46, the pin 116 is positioned in the notch 74a and detents the cycling gear 46 so that the lug 112 is positioned so that the face 118 thereof will be struck by the drive lug 42 on the turntable is rotated from the position shown in FIG. 7 to the position in which the drive lug 42 engages the face 118 of the lug 112 the cycling gear 46 is moved, in a manner similar to that shown in FIG. 3 and described heretofore, so that the pin 116 is positioned in the notch 74b and the lug 114 is moved to the position previously occupied by the lug 112, as shown in FIG. 8. After an additional full revolution of the turntable, the drive lug 42 then strikes the face of the lug 114 and moves the gear 46 a sufficient additional amount so that the teeth 44 thereof again engage the teeth 40 of the turntable hub 16 so that the cycling gear 46 is then driven to complete the record changing cycle in the manner described in detail heretofore. It will be noted that the positioning of the notch 110 can be so chosen with respect to the timed movement of the drive lug 42 so that any desired delay from just slightly more than one revolution of the turntable to almost two full revolutions thereof may be provided with such an arrangement.

Figure 9:
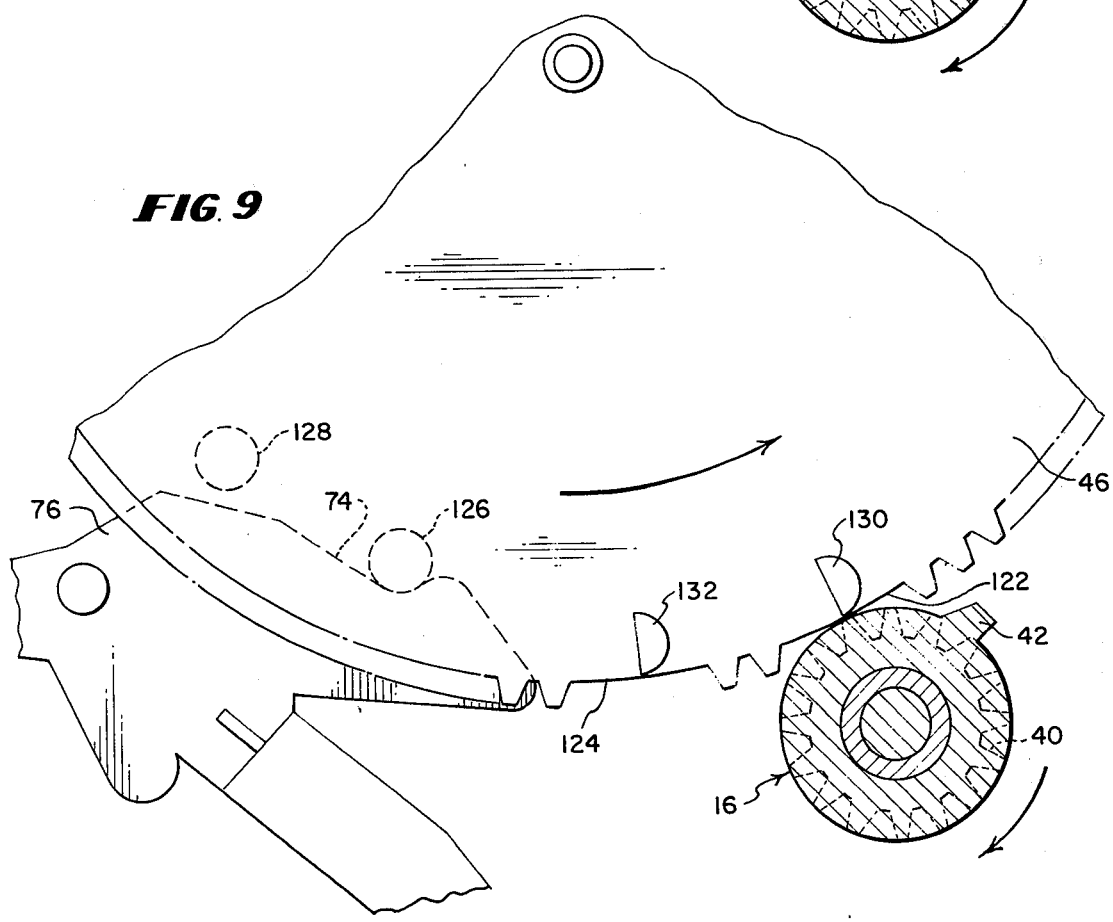
FIG. 9 is a plan view of a further alternative embodiment of the invention wherein an extended delay of the cycling gear movement is provided by two spaced apart notches.

In FIG. 9 a further alternative embodiment of the invention is shown wherein two spaced notches 122 and 124 are provided in the periphery of the cycling gear 46, these notches being spaced apart along the periphery of the gear 46 so that the gear rotates a small increment between the notches 122 and 124. In the embodiment of FIG. 9 the detent lever 76 is substantially the same as in FIGS. 1 to 4, inclusive, and two separate detent pins 126 and 128 are provided on the cycling gear 46 which are arranged successively to engage the notch 74 in the detent lever 76. The lugs 130 and 132 associated respectively with the notches 122 and 124 are arranged successively to be struck by the drive lug 42 on the turntable hub 16. Either one of the notches 122 and 124 may be positioned so as to contribute any desired portion of the total delay which may be as great as just slightly less than two revolutions of the turntable, as described in detail heretofore in connection with the embodiment of FIGS. 7 and 8.

The feature of causing the tone arm to dwell or remain stationary at a point beyond the record path during the record changing cycle has certain advantages which may be found useful even though sticking of the bottom record is not a problem. Thus, in some instances it may be desirable to use a small diameter cycling gear 46, due to space limitations, or the like. However, with a small diameter cycling gear the gear will rotate at a relatively high rate of speed during the changing cycle, since the ratio between the turntable pinion 40 and the gear 46 will be smaller if the diameter of gear 46 is smaller, and the changing cycle will be relatively short. Under these conditions, the tone arm may be moved out beyond the record path and back in too quickly to permit the bottom record to be deposited on the turntable properly, even if the bottom record does not stick to the record stack and delay its dropping as described heretofore. However, by providing the notch 84a a dwell period is provided while the tone arm is beyond the record which is the equivalent of providing a larger gear ratio. For example, if it is desired to use a cycling gear 46 with a diameter which will give a ratio of 1:4 between pinion 40 and gear 46 but this ratio gives too fast a cycle for proper dropping of the record, the provision of the notch 84a which causes the tone arm to dwell beyond the record for approximately one revolution of the pinion 40 gives an effective gear ration of 1:5. If an even higher ratio is desired the embodiment of FIGS. 7 and 8 or the embodiment of FIG. 9 may be employed in which a dwell period of approximately two revolutions is provided so that an effective gear ratio of approximately 1:6 may be achieved while using a small-diameter inexpensive cycling gear 46.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an automatic record changer, a rotatable turntable, means for rotating said turntable during both playing and record changing cycles, means for supporting a stack of records above said turntable, a driving gear on said turntable, automatic record changing means including a cycling gear, means responsive to rotation of said cycling gear during a record changing cycle for releasing the bottom record of said stack of records to be rotated by said turntable, driving means on said turntable and arranged to be moved in a predetermined path as said turntable rotates, means for connecting said cycling gear to said driving gear to initiate a record changing cycle, means defining a gap in the periphery of said cycling gear so that said cycling gear becomes disengaged from said driving gear at a predetermined point in the record changing cycle, thereby to provide a slight delay in the record changing cycle which is sufficient to allow said bottom record to break free from the remainder of the record stack, and projection means carried by said cycling gear and arranged to be positioned in said predetermined path of said driving means, said projection means being struck by said driving means as said turntable rotates, said driving gear and said cycling gear being thus re-engaged at the end of said delay to complete the record changing cycle.

2. The combination of claim 1, wherein said projection means comprises a series of fixed projections which are successively positioned in the path of and then subsequently struck by said driving means as said turntable rotates.

3. The combination of claim 2, which includes a pin on said cycling gear, and a spring biased detent lever, said lever having a series of notches adapted successively to be engaged by said pin when said series of projections are successively positioned in the path of said driving means.

4. The combination of claim 2, which includes detent means for said cycling gear corresponding to each of said series of fixed projections.

5. The combination of claim 1, wherein said projection means comprises a single fixed projection which is positioned in the path of said driving means when said gap is encountered and is struck by said driving means after less than one revolution of said turntable so that the record changing cycle is delayed at said predetermined point for a time period less than one revolution of said turntable.

6. The combination of claim 1, which includes first detent means for positioning said cycling gear at a predetermined initial position at the start of the record changing cycle and second detent means for said cycling gear which is operative to hold said cycling gear stationary at said predetermined point in the record changing cycle.

7. The combination of claim 1, which includes means defining a second gap in the periphery of said cycling gear, and said projection means on said cycling gear comprises a projection associated with each of said gaps.

8. In an automatic record changer, a rotatable turntable, means for rotating said turntable during both playing and record changing cycles, means for supporting a stack of records above said turntable, a tone arm mounted beyond said turntable, a driving gear on said turntable, automatic record changing means including a cycling gear, means responsive to rotation of said cycling gear during a record changing cycle for moving said tone arm outwardly beyond the edge of said record stack, releasing the bottom record of said stack of records to be rotated by said turntable and then engaging said tone arm with the deposited record, driving means on said turntable and arranged to be moved in a predetermined path as said turntable rotates, means for connecting said cycling gear to said driving gear to initiate a record changing cycle, means defining a gap in the periphery of said cycling gear so that said cycling gear becomes disengaged from said driving gear at a predetermined point in the record changing cycle, thereby to provide a delay of less than three revolutions of said turntable so that said tone arm remains at a point beyond said record stack while the bottom record is deposited on said turntable, and projection means carried by said cycling gear and arranged to be positioned in said predetermined path of said driving means, said projection means being struck by said driving means as said turntable rotates, said driving gear and said cycling gear being thus re-engaged at the end of said delay to complete the record changing cycle.

* * * * *